(12) United States Patent
Dutta et al.

(10) Patent No.: US 12,030,795 B2
(45) Date of Patent: Jul. 9, 2024

(54) DESALINATION DEVICE AND METHOD OF MANUFACTURING SUCH A DEVICE

(71) Applicant: Stockholm Water Technology AB, Vällingby (SE)

(72) Inventors: Joydeep Dutta, Vällingby (SE); Karthik Laxman Kunjali, Täby (SE)

(73) Assignee: Stockholm Water Technology AB, Stockholm (SE)

( * ) Notice: Subject to any disclaimer, the term of this patent is extended or adjusted under 35 U.S.C. 154(b) by 885 days.

(21) Appl. No.: 16/623,280

(22) PCT Filed: Jun. 20, 2018

(86) PCT No.: PCT/EP2018/066435
§ 371 (c)(1),
(2) Date: Dec. 16, 2019

(87) PCT Pub. No.: WO2018/234386
PCT Pub. Date: Dec. 27, 2018

(65) Prior Publication Data
US 2020/0180982 A1     Jun. 11, 2020

(30) Foreign Application Priority Data

Jun. 21, 2017 (SE) ..................... 1750797-1

(51) Int. Cl.
*C02F 1/469* (2023.01)
*B01D 61/42* (2006.01)
(Continued)

(52) U.S. Cl.
CPC ........ *C02F 1/4691* (2013.01); *B01D 61/4281* (2022.08); *B01D 63/101* (2022.08);
(Continued)

(58) Field of Classification Search
CPC .. C02F 1/4691; C02F 1/4604; C02F 1/46109; C02F 2001/46138; C02F 2001/16152
See application file for complete search history.

(56) References Cited

U.S. PATENT DOCUMENTS 4,802,960 A * 2/1989 Eisman ................... C25B 15/00
                                                                    205/525
5,584,981 A * 12/1996 Turner ................... B01D 61/48
                                                                    204/647
(Continued)

FOREIGN PATENT DOCUMENTS

| CN | 203877948 | | 10/2014 | |
|---|---|---|---|---|
| KR | 960009108 | Y1 * | 10/1996 | ............... C25B 1/02 |
| KR | 20050020298 | A * | 3/2005 | ............... C02F 1/461 |

OTHER PUBLICATIONS

Øyvind Nydal Dahl, What is Ground in ElectronicCircuits?, Oct. 24, 2014, BuildElectronicCircuits, https://web.archive.org/web/20170316082904/https://www.build-electronic-circuits.com/what-is-ground/ (Year: 2014).*

(Continued)

*Primary Examiner* — Luan V Van
*Assistant Examiner* — Mofoluwaso S Jebutu
(74) *Attorney, Agent, or Firm* — Myers Bigel, P.A.

(57) ABSTRACT

A device (10) for capacitive deionization of an aqueous media containing dissolved ion species, said device comprising a cell with a first primary electrode (2) and a second primary electrode (3) arranged opposite the first primary electrode (2) and preferably separated by at least one non-conductive spacer (4, 4'). A third electrode (7) is arranged between the first and the second electrode. The third electrode (7) is grounded whereas the first and the second electrodes are polarized versus the grounded third electrode.

18 Claims, 6 Drawing Sheets

(51) Int. Cl.
  *B01D 63/10*   (2006.01)
  *C02F 1/46*    (2023.01)
  *C02F 1/461*   (2023.01)
  *C02F 103/08*  (2006.01)

(52) U.S. Cl.
  CPC ........ *C02F 1/4604* (2013.01); *C02F 1/46109* (2013.01); *C02F 2001/46138* (2013.01); *C02F 2001/46152* (2013.01); *C02F 2103/08* (2013.01); *C02F 2201/46* (2013.01)

(56) References Cited

U.S. PATENT DOCUMENTS

| | | | | |
|---|---|---|---|---|
| 2002/0167782 | A1* | 11/2002 | Andelman | C02F 1/008 361/302 |
| 2005/0079409 | A1* | 4/2005 | Andelman | H01M 10/058 429/231.95 |
| 2010/0078327 | A1* | 4/2010 | Noh | C02F 1/4691 156/322 |
| 2011/0024287 | A1* | 2/2011 | Zheng | H01G 11/38 156/60 |
| 2012/0138470 | A1 | 6/2012 | Van Der Wal et al. | |
| 2012/0247959 | A1* | 10/2012 | Seed | C02F 1/4691 204/674 |
| 2016/0229719 | A1* | 8/2016 | Seo | B01D 61/48 |
| 2017/0002472 | A1* | 1/2017 | Beugnet | C02F 1/62 |

OTHER PUBLICATIONS

Habibzadeh, F., Mardle, P., Zhao, N. et al. Ion Exchange Membranes in Electrochemical CO2 Reduction Processes. Electrochem. Energy Rev. 6, 26 (2023). (Year: 2023).*

"Spacer." Merriam-Webster.com Dictionary, Merriam-Webster, https://www.merriam-webster.com/dictionary/spacer. Accessed Sep. 19, 2023. (Year: 2023).*

International Search Report and Written Opinion corresponding to International Application No. PCT/EP2018/066435 dated Jul. 27, 2018.

International Preliminary Report on Patentability corresponding to International Application No. PCT/EP2018/066435 dated Oct. 2, 2019.

Avraham et al. "Limitation of Charge Efficiency in Capacitive Deionization", J Electrochemical Soc. 156(6):P95-P99 (2009).

* cited by examiner

DESALINATION DEVICE AND METHOD OF MANUFACTURING SUCH A DEVICE

STATEMENT OF PRIORITY

This application is a 35 U.S.C. § 371 national phase application of PCT Application No. PCT/EP2018/066435 filed Jun. 20, 2018, which claims priority to Swedish Application No. 1750797-1 filed Jun. 21, 2017, the entire contents of each of which is incorporated by reference herein.

TECHNICAL FIELD

The present disclosure relates in general to a capacitive deionization device for removing charged species from aqueous media, in particular a desalination device and a method of manufacturing such a device.

BACKGROUND

The need for potable water is continuously increasing due to factors such as environmental issues and population growth. As a consequence, also the need for desalination or deionization of water, such as seawater or brackish water, is increasing. There are several techniques for deionization of water, including for example distillation, reverse osmosis and electrodialysis. Another example of a technique for deionization of water is capacitive deionization (CDI).

CDI is a fairly recent technique and is mostly used for electrosorption of salt from brackish water or other water sources which are not immediately suitable for human consumption. Compared to the formerly mentioned techniques, CDI has the advantage of being a relatively energy-efficient technology, especially for water having a fairly moderate salt concentration such as brackish water.

In the CDI technology, electrically conducting electrodes of activated carbon may be utilised for electrosorption of ions. A typical CDI cell comprises of two oppositely placed electrodes separated by a non-conductive spacer through which water can flow. The electrodes are polarized positively and negatively using a DC power source. Ions of counter-charge are electrically attracted to the respective electrodes and adsorbed therein. Thereby, the ions are removed from water present between the electrodes. Thus, the removal of ions in a CDI cell proceeds via electrosorption, where for a given electrode surface the electrosorption capacity is mainly regulated by the magnitude and distribution of the electric field generated at the electrode surfaces.

It is previously known that the electric field characteristics can be improved by coating activated carbon surfaces with nanostructures of polarizable semiconductors. This can lead to better ion adsorption capacity. However, the electric field is also influenced by the distribution potential between the CDI cell anode and cathode, connected to the positive and reference/ground terminals of the power supply, respectively. Assuming equal distribution of potential, the strength and direction of the electric fields generated at the electrode surfaces drives the symmetry and enhances the efficiency of the ion removal process.

It is however important to note that, contrary to popular belief, the applied potential is not equally distributed between the CDI cell anode and cathode. In a conventional CDI cell, the potential at the cathode (which is grounded) is referenced to the circuit ground and governed by the localized earthing conditions, while the potential at the anode is referenced to that of the cathode. This leads to unequal distribution of energy between the cell electrodes, which in turn can give rise to asymmetric ion removal characteristics and lowering of the desalination capacity and charge efficiency of the process.

Cohen, et al., in the article "Enhanced Charge Efficiency in Capacitive Deionization Achieved by Surface-Treated Electrodes and by Means of a Third Electrode", J. Phys. Chem. C 2011, 115, 19856-19863, reported attempts to improve the charge efficiency of CDI processes by using surface-treated activated carbon fibre (ACF) electrodes, and by means of a third, auxiliary, electrode. Their CDI cell comprised an oxidised electrode (which functioned as the negative electrode) and an untreated activated carbon electrode (which functioned as the positive electrode). As the third electrode, an Ag/AgCl mesh electrode was used and was placed between the two ACF electrodes. Prior to the application of the potential difference between the ACF electrodes, the positive electrode was negatively polarized by the assistance of the third electrode. It was found that, despite the non-symmetrical operation of the CDI cell, it increased the charge efficiency of the desalination process.

Leonard et al., in the article "Synthesis and characterization of asymmetric electrochemical capacitive deionization materials using nanoporous silicon dioxide and magnesium doped aluminium oxide", Electrochimica Acta 54 (2009) 5286-5291 discloses that the use of asymmetric insulating oxide nanoparticles as CDI materials increases removal rates due to their small size and opposite surface potentials. In the CDI cell, a third reference electrode consisting of a saturated calomel electrode (SCE) was also used for the purpose of knowing the exact electrochemical potential applied.

US 2013/0146463 A1 discloses an apparatus and a method for removing ions from water. The apparatus comprises a stack of at least five electrodes in a housing, wherein three of the electrodes are so called master electrodes and the electrical potential difference is applied between each adjacent two master electrodes. The other two electrodes of the at least five electrodes are so called floating electrodes and each located between at least two adjacent master electrodes. The floating electrodes are constructed to attract ions from the water as a result of the electrical potential difference between master electrodes. The floating electrodes according to this apparatus will be polarized as a consequence of the applied electrical potential difference between the master electrodes, and therefore act as an anode to a first master electrode and as a cathode to a second master electrode located on the side opposite to the first master electrode.

During the CDI process, each electrode adsorbs counter-ions, but also desorbs co-ions. This result in lower charge efficiency since some of the energy is consumed for the undesired desorption. Therefore, there has also been attempts with ion selective membrane assisted CDI. The purpose thereof is to more efficiently trap the ionic species to avoid the undesired desorption of co-ions at the electrode surfaces which incidentally leads to additional charge available for counter ion adsorption. The presence of the ion selective membranes may improve the ion removal efficiency of the CDI cell. However, it also results in a considerably higher cost of the device, a resistance to the flow of water to be purified and to the ion transport within the device.

U.S. Pat. No. 6,709,560 and US 2011/0042205 A1 disclose examples of such devices seeking to overcome the problem of desorption of co-ions from the electrodes.

CDI is not only suitable for desalination of water, but can also be used for other types of water purification. For example, CDI may be used for water softening. In such a process, the ions to be removed may for example originate from the contaminants $CaCl_2$, $MgCl_2$, $CaCO_3$ and $MgCO_3$.

JP 2006305407 describes a water treatment tank for denitrification, wherein said tank comprises three electrodes, whereof two are supplied with alternating high voltage (10 to 50 V) and a third is grounded, removing nitrate and/or nitrite ions by electrolytic reduction.

US 2015/0064501 discloses bio-electrochemical systems (BES) having configurations with spiral wound structures and with frame-and-plate structures which may be used for example for energy or chemical production, and/or desalination.

There is however still a need for further improving the ion removal capacity in a CU process, and to make available a robust and efficient desalination device.

SUMMARY

One object of the present invention is to make available a device which can improve the efficiency of capacitive deionization for removal of charged species from aqueous media while still obtaining an energy efficient process.

The object and others is achieved by a capacitive deionization device or desalination device as presented in the present disclosure and in the attached claims.

According to a first aspect, the capacitive deionization device comprises a first electrode and a second electrode, the second electrode opposing the first electrode. The first electrode and the second electrode are preferably separated from each other by at least one electrically non-conductive spacer arranged between the first electrode and the second electrode. The optional at least one electrically non-conductive spacer is configured to allow flow of aqueous media through the spacer. The device further comprises a third electrode between the first electrode and the second electrode. The third electrode is configured to allow substantially free and unrestricted flow of aqueous media from a first side of the third electrode facing the first electrode, to a second side of the third electrode facing the second electrode. Moreover, the third electrode is configured to be electrically grounded, and the first electrode and the second electrode are configured to be polarizable with opposite charges with respect to the third electrode.

The third electrode is preferably made of chemically inert and flexible material. The material being chemically inert makes it chemically stable and the flexibility together with material makes it physically stable when rolled into spiral/cylindrical structure.

It is not intended that charged species to be removed from the aqueous media are to be absorbed by the third electrode. Instead, the third electrode in the device according to the present invention serves the purpose of enabling a control and distribution of the energy substantially equally between the first electrode and the second electrode. Therefore, during use of the capacitive deionization device, the third electrode is electrically grounded and the first electrode and the second electrode are each polarized with opposite charges with reference to the grounded third electrode. This ensures that the potential is divided substantially equally between the first electrode and the second electrode. Thereby, a substantially symmetric anion and cation removal capacity is enabled, which in turn prevents unwanted changes in pH and chemistry of the aqueous media.

Furthermore, the third electrode ensures that the electric fields generated between the first and second electrodes converge from both sides at the third electrode, thereby improving the field distribution between the first electrode and the second electrode. Improved field distribution leans to efficient power utilisation and improved ion removal capacity for the CU device.

The third electrode preferably comprises a circumferential outer peripheral edge which has substantially the same circumferential size and shape as a circumferential peripheral edge of the first electrode and/or a circumferential peripheral edge of the second electrode. This helps the third electrode to distribute the electrical field lines appropriately between the electrodes.

The third electrode preferably has the geometrical configuration of a ring, such as a circular ring, a rectangular ring, a square ring or an octahedral ring. Thereby, it is ensured inter alia that the third electrode does not cause any physical division for the flow of the aqueous media in the device.

The third electrode is preferably arranged at substantially equal distances from the first electrode and the second electrode. This has the effect of inter alia providing substantially symmetric anion and cation removal capacities which in turn prevent unwanted changes in water pH and chemistry.

The third electrode is preferably made of carbon or a carbon-based material, most preferably an activated carbon cloth, a graphite plate/foil, or one or more graphene sheets. However other conductive, chemically inert, physically stable and flexible materials may also be used.

The third electrode is preferably arranged in the form of a coating on an electrically non-conductive spacer, preferably on a flexible electrically non-conductive spacer. In this way a compact structure is achieved. Alternatively, the third electrode is printed on the electrically non-conductive spacer, preferably on a flexible electrically non-conductive spacer. This also makes it possible to achieve a compact structure, and it also makes it possible to arrange the electrode material in desired patterns, using existing printing techniques.

Alternatively, the third electrode can be embedded in a monolithic electrically non-conductive spacer which is fluid and ion permeable; preferably in a flexible, fluid and ion permeable, monolithic non-conductive spacer. The monolithic electrically non-conductive spacer is then preferably arranged in direct contact with the first electrode at a first side surface of the monolithic spacer, and in direct contact with the second electrode at a second side surface of the monolithic spacer.

Preferably the first electrode, the second electrode and the third electrode are arranged in a spiral form around a common longitudinal and/or central axis such that the first electrode, third electrode and second electrode are periodically repeated along the radius in a plane perpendicular to the longitudinal/central axis and jointly form a substantially cylindrical structure. Thereby, a larger electrode surface area can be achieved in the CU device while still obtaining a reasonable size of the device. In such structure, flexible activated carbon cloth can be used as the electrode material for the first and second electrodes and for example flexible graphite foil can be used as the third electrode. Advantageously, this cylindrical/spiral structure also helps to concentrate the electric field lines within the device and leads to further enhancement of the ion adsorption efficiency.

The substantially cylindrical structure can be further arranged in a substantially cylindrical housing which comprises an inlet at a first end surface of the housing and an outlet at a second end surface of the housing. Preferably each electrode comprises at least one current collector extending out from the housing through one of the first end surface and the second end surface. In this way a robust construction of the device is achieved.

The present invention further relates to a capacitive deionization arrangement comprising a plurality of capacitive deionization devices, wherein at least one of the plurality of capacitive deionization devices is a capacitive deionization device as generally defined above.

Another aspect relates to a method for manufacturing a capacitive deionization device. The device is preferably a device as generally described above. The method of manufacturing a capacitive deionization device comprises providing a first electrode, arranging a third electrode on a first side of the first electrode and arranging a second electrode on a second side of the third electrode, wherein the third electrode is configured to allow free and unrestricted flow of aqueous media from a first side surface of the third electrode facing the first electrode to a second side surface of the third electrode facing the second electrode, providing a grounded connection to the third electrode, and connecting the first electrode and the second electrode such that they are polarizable with opposite charges with respect to the third electrode. In this method, a spacer is arranged between the first side of the first electrode and first side of the third electrode, and similarly, a spacer is arranged also between the second side of the third electrode and the first side of the second electrode. Preferably each one of the first electrode, the second electrode and the third electrode is made of a chemically inert and flexible conductive material. By this method, a device is obtained, which can improve the efficiency of capacitive deionization for removal of charged species from aqueous media while still operating in an energy efficient manner.

The method preferably further comprises arranging at least one electrically non-conductive spacer between the first electrode and the second electrode. In this way the three electrodes can be electrically isolated from each other in a simple and robust manner.

The method preferably comprises arranging the first electrode, third electrode, second electrode and the optional spacers into a layered structure. Most preferably this layered structure is folded or rolled up in an efficient manner, for example in a manner resembling a Swiss roll cake or a folded pastry.

Additionally, the method preferably further comprises providing the third electrode as a carbon fibre cloth, preferably activated carbon cloth or a graphite plate/foil.

The method preferably further comprises rolling the first electrode, third electrode and second electrode in the layered structure into a spiral form around a common longitudinal and/or central axis such that the first electrode, third electrode and second electrode are periodically repeated along a radius in a plane perpendicular to the longitudinal/central axis to a substantially cylindrical structure. Thus, even fluid distribution can be effectively achieved.

Additionally, the method preferably further comprises arranging the rolled substantially cylindrical structure into a substantially cylindrical housing comprising a first end surface and a second end surface, and arranging an inlet at the first end surface of the housing and an outlet at the second end surface of the housing, and arranging for each electrodes at least one current collector extending out through the housing through at least one of the first end surface and the second end surface. In this way a compact structure is obtained.

In an embodiment, the first electrode, third electrode and second electrode are arranged around a perforated pipe having an open end and a closed end, said open end of the pipe serving as inlet or outlet for aqueous media to be subjected to capacitive deionization.

Further, the method preferably further comprises providing the third electrode such that a circumferential outer peripheral edge of the third electrode coincides with a circumferential peripheral edge of the first electrode and/or a circumferential peripheral edge of the second electrode. This assists the third electrode in distributing the electrical field lines appropriately between the electrodes.

The third electrode is preferably arranged as a ring-shaped electrode, such as circular ring, a rectangular ring, square ring or octahedral ring, whereby it is ensured inter alia that the third electrode does not cause any physical division of the aqueous media in the device.

The method preferably further comprises arranging the third electrode at substantially equal distances from the first electrode and the second electrode. In this way, symmetric anion and cation removal capacities which prevent unwanted changes in water pH and chemistry are obtained.

Furthermore, the method preferably comprises coating the third electrode on an electrically non-conductive spacer, preferably on a flexible electrically non-conductive spacer. Alternatively, the method preferably further comprises embedding the third electrode in a monolithic electrically non-conductive spacer, preferably a flexible monolithic non-conductive spacer. In this embodiment, freely combinable with other embodiments disclosed herein, the method comprises arranging the monolithic electrically non-conductive spacer in direct contact with the first electrode at a first side surface of the monolithic spacer and in direct contact with the second electrode at a second side surface of the monolithic spacer.

A third aspect relates to a method of deionizing an aqueous media comprising the use of a capacitive deionization device or an arrangement of such devices as described above for removing charged species from the aqueous media.

BRIEF DESCRIPTION OF THE DRAWINGS

The invention and embodiments thereof will now be described, by way of non-limiting examples, with reference to the accompanying drawings, in which:

FIG. 4b schematically illustrates a cross sectional view in the plane B-B of the device for capacitive deionization according of FIG. 4a.

FIG. 6b schematically illustrates a cross sectional view of a device for capacitive deionization according to a further exemplifying embodiment of the present invention showing a flow path going from the outside and in.

FIG. 12 illustrates a cross section of an embodiment where several units 120 comprising a perforated pipe and the spiral wound CU electrodes are assembled together within a casing or enclosure, forming a cassette 130. Said cassette preferably has an inlet 131, a collection reservoir 132 and an outlet 133. The cassette is divided into two parts by a plate 140 in which the units 120 can be attached, e.g. by inserting the open end 101 optionally with threads 102, into holes in said plate 140. A flow from left to right, corresponding to the principle shown in FIG. 6b is indicated with arrows. The flow can equally be the opposite, corresponding to the principle shown in FIG. 6a.

DETAILED DESCRIPTION

The present invention will be described below with reference to the accompanying drawings and certain exemplifying embodiments. The invention is however not limited to the embodiments shown, but can be varied within the scope of the appended claims. Moreover, the drawings shall not be considered to necessarily be drawn to scale as some features may be exaggerated in order to more clearly illustrate the features of the device(s) or the details thereof.

Before the present invention is described, it is to be understood that the terminology employed herein is used for the purpose of describing particular embodiments only and is not intended to be limiting, since the scope of the present invention will be limited only by the appended claims and equivalents thereof.

It must be noted that, as used in this specification and the appended claims, the singular forms "a," "an," and "the" include plural referents unless the context clearly dictates otherwise.

In the present disclosure, the term "electrode surface area" shall be considered to mean the geometrical surface area of an electrode in the plane of the electrode, irrespective of whether the plane of the electrode is a planar plane or has another configuration such as undulating or cylindrical. This is in contrast to the term "specific surface area" which shall be considered to mean the total surface area per unit of mass.

Furthermore, in the present disclosure the term "electrically non-conductive" is used. It should be recognised that all materials have a certain electrical conductivity even if it is very low. By way of example only, even a material considered to be an isolator will have a certain electrical conductivity. Thus, an electrically non-conductive material or an electrically non-conductive material constituent component shall in the present disclosure be understood to mean a material or constituent component having such a low electrical conductivity that the electrical conductivity therein is so low that there will be essentially no electrical conductivity therein when the device according to the present invention is used as intended during the operation thereof. In other words, electrically non-conductive shall be considered to mean a negligible electrical conductivity when used as intended.

Figures 1, 2A, 2B:
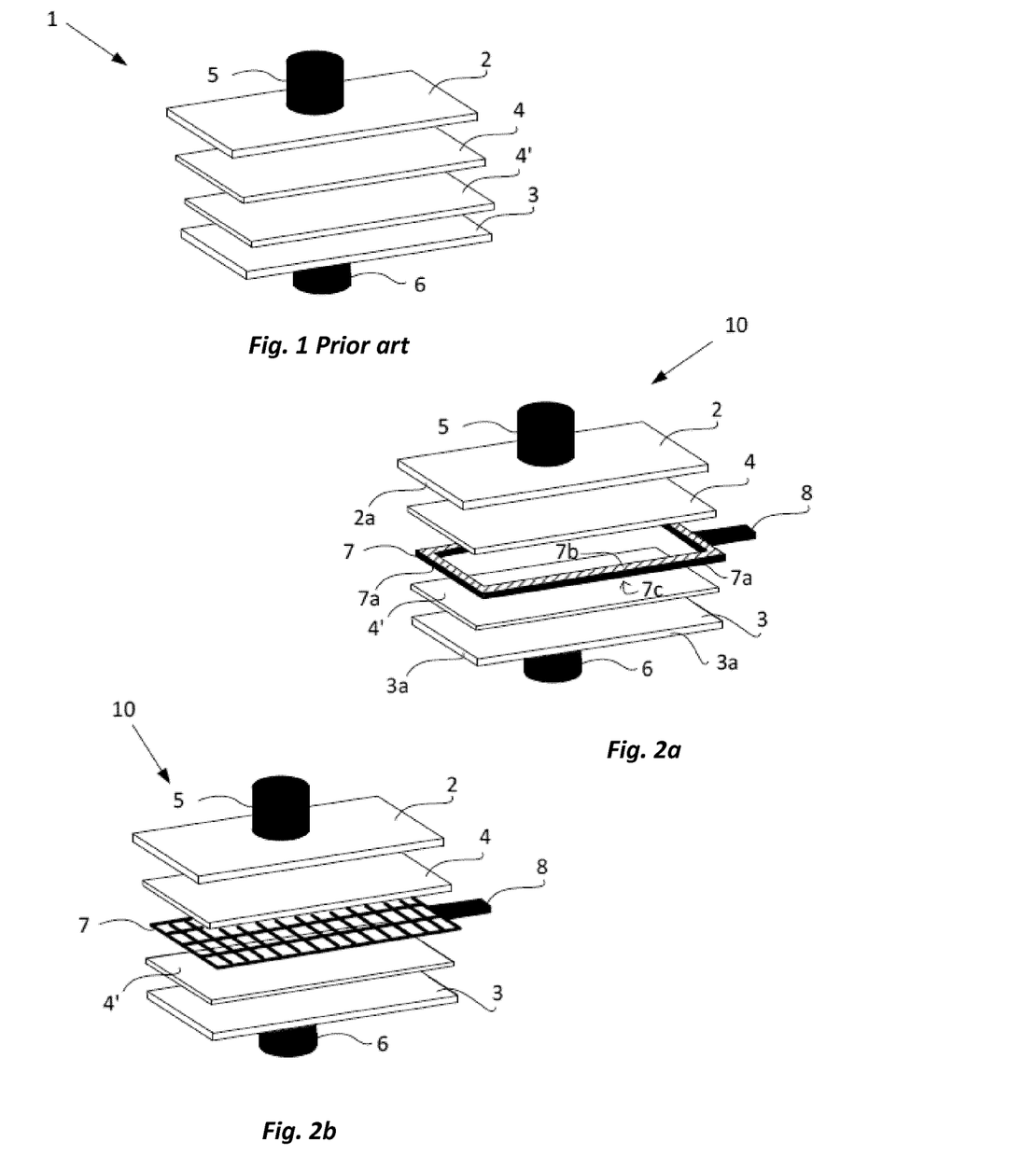
FIG. 1 illustrates an exploded perspective view of a device for capacitive deionization according to the prior art.
FIG. 2a illustrates an exploded perspective view of a device for capacitive deionization according to a first exemplifying embodiment of the present invention.
FIG. 2b illustrates an exploded perspective view of a device for capacitive deionization according to another exemplifying embodiment of the present invention.

FIG. 1 illustrates an exploded perspective view of a capacitive deionization device 1 according to prior art. The CU device comprises a first electrode 2 and a second electrode 3. These electrodes are sometimes referred to as "primary electrodes" or "master electrodes". The first and second electrodes are planar electrodes arranged in opposite, preferably in parallel to, each other. Aqueous media from which charged species are to be removed is intended to flow through the volume between the first electrode and the second electrode and in general also the volumes of the electrodes themselves as the electrodes are permeable to aqueous media.

The first and second electrodes 2, 3 are usually separated by a first electrically non-conductive spacer 4. The device further optionally comprises more than one non-conductive spacer, as illustrated in FIG. 1 by a second electrically non-conductive spacer 4'. The purpose of the non-conductive spacer or spacers is primarily to avoid the risk of electrical short-circuit between the first electrode 2 and the second electrode 3 during operation of the device. Furthermore, the non-conductive spacer or spacers facilitate the control of the appropriate distance between the first and second electrodes 2, 3 to thereby obtain an appropriate electrical field distribution between the first electrode and the second electrode. The electrically non-conductive spacer is arranged as a separate constituent component or alternatively, is applied as a coating or layer on the surface of the electrodes. Aqueous media, such as water to be purified, is preferably led through the non-conductive spacer(s). Usually, the electrodes 2, 3 are in direct contact with the spacer/spacers(s).

The device 1 further comprises a first current collector 5 connected to the first electrode 2, and a second current collector 6 connected to the second electrode 3. In a conventional CDI device, the cathode is generally grounded and the anode is polarized with reference to the cathode. The electrodes are connected via the respective current collectors to a DC power source (not shown) in order to enable polarization of the electrodes.

During operation of the CDI device, anions are attracted to the positive electrode and absorbed in the positive electrode. Simultaneously, cations are attracted to the negative electrode and adsorbed therein. Thereby, the ions are removed from the aqueous media present between the electrodes.

In any CDI device, ions are attracted in response to the potential mediated electric field lines generated at the electrode surfaces. Thus, the ion removal and capacity is proportional to the distribution and strength of the lines of field.

In contrast to the prior art as shown in FIG. 1, the device according to the present invention comprises a third electrode arranged between the two primary electrodes, i.e. the first electrode and the second electrode. The third electrode is configured to be electrically grounded and the two primary electrodes, i.e. the first electrode and the second electrode, are configured such as to be polarizable with opposite charges with respect to the grounded third electrode. This ensures that the potential is divided substantially equally between the positive and negative electrodes, thus enabling symmetric anion and cation removal capacities which prevents unwanted changes in water pH and chemistry.

Additionally, the third electrode ensures the electric fields generated between the primary electrodes converge from both sides at the central third electrode, thereby improving the field distribution between the primary electrodes. Improved field distribution leads to efficient power utilization and improved ion removal capacity for the CDI device.

The third electrode is configured to allow free flow of aqueous media from a first side of the third electrode to a second side of the third electrode. The first side surface of the third electrode is in the present disclosure considered to mean the side of the third electrode facing the first electrode. Correspondingly, the second side of the third electrode is in the present disclosure considered to mean the side of the third electrode facing the second electrode. In the present disclosure, a free or unrestricted flow of aqueous media from a first side to a second side is considered to mean that aqueous media can pass through the third electrode without any significant pressure drop.

This is in contrast to for example the first and second electrodes, through which aqueous media is allowed to pass but wherein this would result in a pressure drop of the aqueous media from a first side of the electrodes to a second side of the electrodes. In other words, the third electrode is not intended to cause any physical division of water flow between the different sides of the third electrode. However, the third electrode provides an electrical division of the volume between the first electrode and the second electrode.

It is preferred that the third electrode is arranged at equal distances from the first electrode and the second electrode, i.e. midway between the first electrode and the second electrode. This ensures that the potential will be divided equally between the first electrode and the second electrode with respect to the third electrode, and thereby enables an essentially symmetrical adsorption of charge species at the primary electrodes. However, it should be noted that a certain tolerance as to the position of the third electrode with respect to the first and second electrodes is possible while still obtaining a sufficiently good result.

Thus, the third electrode is preferably arranged at a distance which is 40-60% of the distance between the first electrode and the second electrode if a symmetric cation and anion removal is desired. When discussing a distance between the first electrode and/or the second electrode to the third electrode, it shall in the present disclosure be considered to mean a distance between the surface of the first electrode and/or second electrode to a central plane of the third electrode, the central plane of the third electrode being parallel to the side surfaces of the third electrode.

According to an alternative aspect, the capacitive deionization device is used in applications where preferential anion or cation removal is desired. Therefore, depending on the desired ion removal, the distance of the third electrode with respect to the first and second electrodes is flexible. In general, the third electrode is arranged at a distance which is 10-90% of the distance between the first electrode and the second electrode, while still maintaining acceptable pressure drop and fluid flow permeability. For example, if the third electrode is closer to the first surface of the first electrode then the electric field between the first and third electrode is stronger than the third and second electrode, leading to preferential anion removal if the first electrode is positive and vice versa. Thus the third electrode can provide a means to preferentially remove either positively or negatively charged species without chemical modification of the first, second or third electrodes.

FIG. 2a illustrates an exploded perspective view of a first exemplifying embodiment of a CDI device 10 according to the present invention. The CDI device 10 comprises a first electrode 2 and a second electrode 3, with a respective current collector 5, 6. While the current collectors 5, 6 are illustrated in the figure as extending from the electrodes substantially perpendicular to the plane of the electrodes 2, 3, it is also possible that the current collectors extend from the electrodes substantially in the same plane as the electrodes or in an angular direction from the plane of the electrodes. The first and second electrodes 2, 3 are primary electrodes intended for adsorption of ionic species to be removed from aqueous media present in the volume comprising the volume of primary electrodes and the volume between the primary electrodes. Thus, removal of ionic species occurs both from aqueous media present/flowing inside the primary electrodes as well as aqueous media present/flowing in the space between the primary electrodes.

In the CDI device according to FIG. 2a, the first and second electrodes 2, 3 are substantially planar electrodes. Moreover, the first and second electrodes are preferably arranged essentially parallel in order to ensure that the electrical field is equal from a first peripheral edge of the respective electrodes to a second peripheral edge of the electrodes. While the first and second electrodes are illustrated in the figure as having a substantially rectangular electrode surface area, it is also possible that they would have an electrode surface area having any other geometrical configuration, such as square shaped, circular, triangular, octahedral etc.

In contrast to the CDI device 1 illustrated in FIG. 1, the CDI device 10 as illustrated in FIG. 2a comprises a third electrode 7 arranged between the first electrode 2 and the second electrode 3. The third electrode 7 comprises a connection means 8 enabling the third electrode to be electrically grounded. The first electrode 2 and the second electrode 3 are configured to be polarizable with opposite charges with respect to the third electrode 7. The third electrode 7 therefore acts as the reference during operation of the CU device 10. Preferably, the third electrode is arranged at equal distances from the first electrode and the second electrode. Thereby, the potential will be divided equally between the first and second electrodes, and the distribution of the electric field lines of forces will be equal between the volumes on either side of the third electrode.

As shown in FIG. 2a, the third electrode 7 preferably has a circumferential peripheral edge 7a having essentially the same circumferential size and shape as the peripheral circumferential edge 2a of the first electrode and the peripheral circumferential edge 3a of the second electrode. In other words, the outer geometrical configuration of the third electrode preferably corresponds to the outer geometrical configuration of the first electrode 2 and the outer geometrical configuration of the second electrode 3. When the circumferential edge of the third edge follows the circumferential edge of the primary electrodes, the electric field lines are better distributed and confined within the space between the first electrode and the second electrode. This is advantageous compared to the case where there is no third electrode present or if the third electrode is placed outside the volume between the first and second electrodes.

The third electrode 7 preferably has the geometrical configuration of a substantially planar ring, such as a rectangular ring as illustrated in FIG. 2a, and thereby comprising a central opening allowing free flow of aqueous media from a first side 7b of the third electrode facing the first electrode 2 to a second side 7c of the third electrode facing the second electrode 3. Other ring structures include, but are not limited to, circular rings, square rings, octahedral rings etc. Furthermore, there are also other possible geometrical configurations of the third electrode than a ring, such as a highly porous structure, a mesh structure or a plurality of strips of foil interconnected with each other to jointly form the third electrode. FIG. 2b illustrates another exemplifying embodiment which differs from the exemplifying embodiment shown in FIG. 2a merely in that the third electrode 7 is arranged in the form of a mesh structure. Even though the third electrode can have different geometrical configurations as described above, it is however important that the third electrode does not physically divide the flow of aqueous media between the sides of the third electrode. If the third electrode would physically divide the CDI device, there would be two physical half-cells, each working in unison with one side of the third electrode being polarized positively with respect to one primary electrode and the other side negatively polarized with respect to the other primary electrode. This would in such a case result in each half of the device acting like an individual CDI cell.

The electrode surface area of the third electrode 7 should be considerably smaller than the electrode surface area of the first electrode and the electrode surface area of the second electrode in order to ensure that the third electrode allows a free flow of aqueous media from one side to another of the third electrode and to avoid the risk that the third electrode would actively contribute to ion adsorption. If the third electrode has such a large surface area that it actively contributes to ion adsorption, it could risk leading to electrode asymmetry, wherein the ion adsorption of the CDI device will be limited by the capacity of the electrode having the lowest surface adsorption capacity (in this case the third electrode). Preferably, the electrode surface area of the third electrode is maximally 30%, preferably maximally 25%, most preferably maximally 20%, of the electrode surface area of each of the primary electrodes. Moreover, the third electrode preferably has a specific surface area which is less than 5% of the specific surface area of each of the primary electrodes, more preferably less than 2% of the specific surface area of each of the primary electrodes.

Furthermore, in the same manner as in accordance with the prior art disclosed with regard to FIG. 1, the CDI device 10 as illustrated in FIGS. 2a and 2b preferably also comprises one or more spacers 4, 4' arranged between the first and second electrodes. The purpose of such a spacer or spacers is primarily to avoid the risk for electrically short-circuiting the primary electrodes with each other and with the third electrode during use of the CDI device. The spacer(s) also have the advantage of facilitating the arrangement of the electrodes to ensure the intended appropriate distance between the electrodes.

As shown in FIGS. 2a and 2b, the CDI device 10 preferably comprises an electrically non-conductive spacer 4, 4' on each side of the third electrode facing a primary electrode. The spacer or spacers is/are preferably in the form of a separate constituent component or alternatively in the form of a coating on the surface of a primary electrode facing the opposing primary electrode. Alternatively, it is also possible that the third electrode is embedded in an electrically non-conductive monolithic spacer, said monolithic spacer is preferably in direct physical contact with both the first electrode and the second electrode. Alternatively, the third electrode constitutes a coating layer on an electrically non-conductive spacer, or the spacer(s) constitute a coating on the surface of the third electrode. When the spacer or spacers are in the form of a coating on one or more of the first, second and third electrodes, the spacer/spacers for example constitute a dielectrically polarizable material. Examples of suitable dielectrically polarizable materials include, but are not limited to, zinc oxide, titanium oxide, alumina and zirconia.

Figure 3:
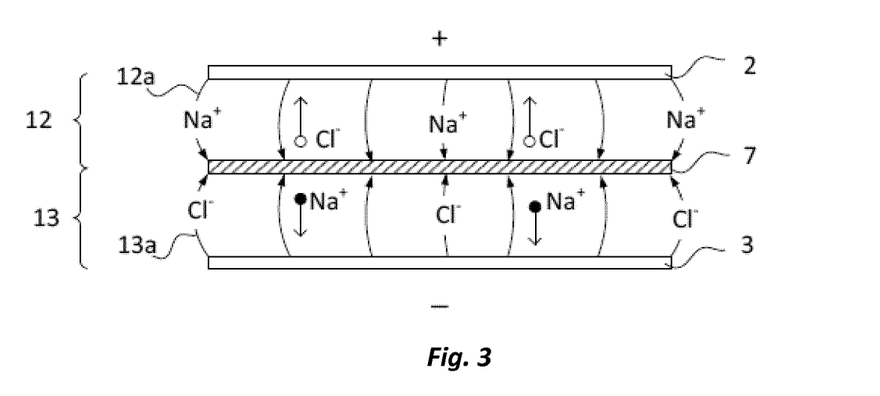
FIG. 3 schematically illustrates the electrical field of, and the ion transport in, a CU device according to the present invention during operation thereof for removal of charged species from aqueous media, here exemplified by sodium and chloride ions.

FIG. 3 schematically illustrates the electrical field of, and the ion transport in, the CDI device during operation. The CDI device is illustrated in a cross sectional view for ease of illustration. The third electrode 7 may have any one of the geometrical configurations disclosed above, but has in the drawing been drawn as a solid shape for ease of illustration. Furthermore, as can be seen from FIG. 3, the outer dimensions of the third electrode 7 are limited by the outer dimensions of the primary electrodes 2, 3 as previously discussed with reference to FIGS. 2a and 2b.

As illustrated in FIG. 3, the third electrode 7 provides the CDI device with two electrical half-cells 12, 13, one on either side of the third electrode 7 (without causing any physical division of the device as described above). In the figure, the first electrode 2 is positively polarized and the second electrode 3 is negatively polarized with respect to the third electrode 7. It is however evident that the opposite can apply, i.e. that the first electrode 2 is negatively polarized and the second electrode 3 is positively polarized with respect to the third electrode 7.

Negatively charged species, in FIG. 3 exemplified by chloride ions ($Cl^-$), are drawn to the positively polarized first electrode 2. Correspondingly, positively charged species, in the figure exemplified by sodium ions ($Na^+$), are drawn to the negatively polarized second electrode 3. The electrical field lines 12a in the first electrical half-cell 12 will repel cations, and the electrical field lines 13a in the second electrical half-cell 13 will repel anions. The repulsion of co-ions is an important effect of the present invention, since it significantly reduces the problems associated with desorption of co-ions from the electrodes (previously been sought to overcome by membrane assisted CDI devices).

Figure 4A:
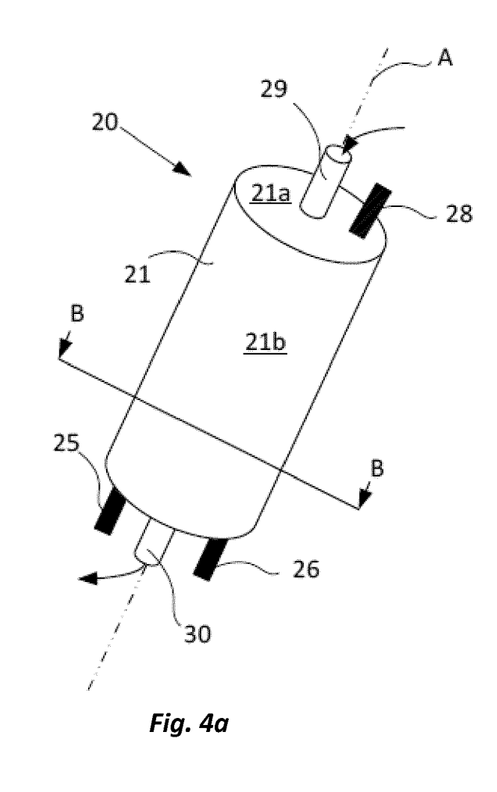
FIG. 4a illustrates a perspective view of a device for capacitive deionization according to yet another exemplifying embodiment of the present invention.
Figure 4B:
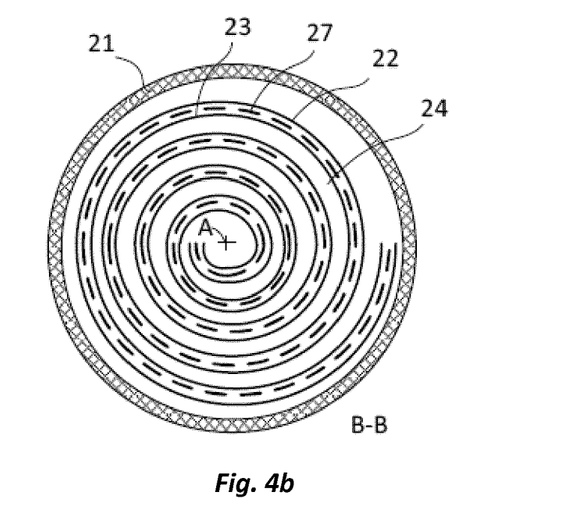

FIG. 4a illustrates a perspective view of yet another exemplifying embodiment of the CDI device according to the present invention. FIG. 4b schematically illustrates a cross-sectional view along the plane B-B of FIG. 4a.

The CDI device 20 according to the exemplifying embodiment shown in FIGS. 4a and 4b differs from the CDI device 10 of the exemplifying embodiment as described with reference to FIGS. 2a and 2b (including the modifications described) in that the electrodes are rolled into a cylindrical and spiral configuration illustrated in FIG. 4b. This has the effect of enabling a larger portion of the electrode surface area to interact with the stream of aqueous media within the CDI device. Furthermore, it localizes the electric field lines to improve potential distribution further.

The CDI device 20 comprises an outer housing 21 adapted to confine the aqueous media inside the CDI cell during the deionization process. The outer housing 21 has for example a cylindrical configuration such that it comprises a first end surface 21a, an envelope surface 21b, and a second end surface (not shown) opposing the first end surface 21a. The housing comprises an inlet 29 through which the aqueous media is introduced into the CDI device, and an outlet 30 through with the aqueous media exits the CDI device after the deionization. The inlet and outlet may be concentric with the central axis of the CDI device, however other configurations are also possible.

As shown in FIG. 4b, the first electrode 22, the third electrode 27 and the second electrode 23 are spirally wound around the central axis A. Thus, the electrodes are periodically repeated along the radius in a plane perpendicular to the central axis. It should be noted that even though not illustrated in the figure, the CDI device 20 preferably comprises electrically non-conducting spacers in the same manner as disclosed above with reference to FIGS. 2a and 2b. Furthermore, the CDI device comprises at least one further electrically non-conductive spacer arranged in the space 24 between each turn of the electrodes around the central axis in order to avoid electrical short-circuiting between the first electrode and the second electrode. One way of achieving this is by coating the surface of at least one of the first electrode and the second electrode opposite the side facing the third electrode with an electrically non-conductive material or by arranging an electrically non-conductive porous material in space 24, which material however is permeable to aqueous media and ions.

As shown in FIG. 4a, the current collector 25 of the first electrode 22 extends through the housing 21 for enabling the electrical connection to the DC source. Likewise, the current collector 26 of the second electrode 23 and the connection means 28 of the third electrode 27 are extending through the housing 21 for providing the electrical connection. The current collectors 25, 26 and connection means 28 preferably extend through a side surface of the cylindrical housing 21 as shown in the figure. However, other configurations are also possible without departing from the scope of the present invention.

The power scheme of the CDI device according to the present invention is different from a traditional CDI device since the third electrode is grounded and the primary electrodes polarized with opposite charges with respect to the third electrode. However, in the same manner as a traditional CDI device, the polarization shall be able to be switched such that the CDI device can be regenerated.

Figure 5:
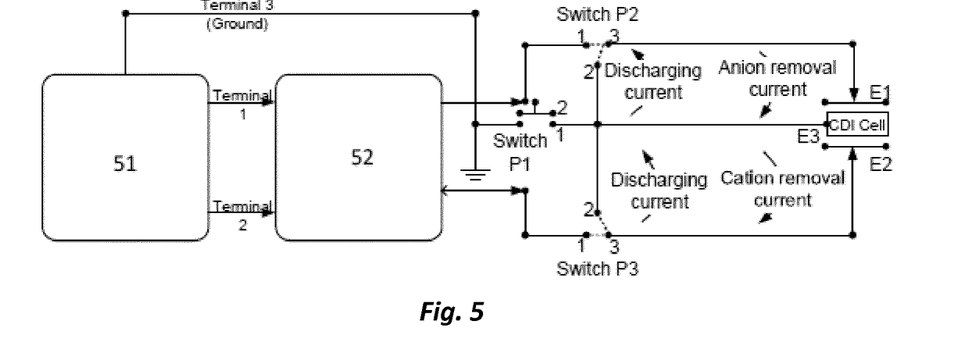
FIG. 5 schematically illustrates one example of a possible circuit diagram for a DC power supply with three terminals and its connection to the CDI cell according to the present invention.

FIG. 5 illustrates one example of a connection of the CDI device according to the present invention to a power supply comprising a centre tapped transformer 51 and a rectifier circuit 52 with filters for smooth DC. The power supply may comprise a centre tapped transformer 51 with three output terminals. One terminal, preferably the central terminal, is connected to the ground, while the other two terminals of the power supply are connected to the two primary electrodes E1 and E2 of the CDI cell. The potential at the two terminals is referenced from the central grounded terminal and is equal and opposite each other. The equal and opposite terminals are connected to the two primary electrodes E1 and E2, wherein one electrode is negative and the other is positive and the central third electrode E3 is connected to the grounded terminal of the power supply via a switch. By way of example only, the output power supply may be limited to a total potential difference of 1.6 VDC, giving +0.8 V to the positive electrode in reference to the central electrode and −0.8V to the negative electrode in reference to the central electrode.

During ion removal or desalination, switch P1 is closed (giving the central electrode of the CDI cell the same potential as the circuit ground), while switches P2 and P3 have their 1 and 3 leads shorted. This configuration leads to current for anionic adsorption (at the positive electrode) to flow from the positive power supply terminal into the CDI cell central electrode (Anion removal current), through the negative electrode into the power supply ground. Similarly the current for the cation adsorption (at the negative electrode) flows from the grounded power supply terminal into the CDI central electrode (Cation removal current), into the CDI negative electrode and back into the power supply negative terminal. Thus the directions of anion and cation charging currents are reversed.

During electrode regeneration, switch P1 is opened (disconnecting the central electrode from the ground potential, while switches P2 and P3 have their 2 and 3 leads shorted. This configuration leads to current for anionic desorption (at the positive electrode) to flow from the positive CDI cell electrode, through switch P2 and into the CDI central electrode in a loop, removing adsorbed anions and giving out energy in the process. Similarly the current for the cation desorption (at the negative electrode) flows from the CDI central electrode, into switch P3 and into the CDI negative electrode in a loop, removing adsorbed cations and giving out energy in the process. Thus the directions of anion and cation desorption currents are the same. The charge stored in the CDI cell electrode will flow as current until all the ions held by the charged electrode surface are removed into the solution.

Thus, as explained above, the two primary electrodes will have equal and opposite potential with respect to the third electrode. However, if the third electrode and the reference terminal from the transformer are left open/floating, then electrically both will develop an active high potential, thus increasing the absolute potential at the two primary electrodes. While the CDI cell in such a case might still function, it will be difficult to determine the absolute reference potential, and it may shift the baseline potential, which can lead to unwanted Faradaic reactions at the two primary electrodes and loss of energy in the process.

A method for manufacturing a capacitive deionisation device preferably comprises the steps of providing a first electrode, arranging a third electrode on a first side of the first electrode and arranging a second electrode on a second side of the third electrode. The third electrode is configured to allow free flow of aqueous media from a first side surface of the third electrode facing the first electrode to a second side surface of the third electrode facing the second electrode. In this method a grounded connection to the third electrode is provided. The first electrode and the second electrode are connected such that they are polarizable with opposite charges with respect to the third electrode.

Further, the method preferably comprises arranging at least one electrically non-conductive spacer between the first electrode and the second electrode. The spacer(s) electrically isolate the electrodes from each other. Preferably fluid is allowed to flow through the spacers with negligible pressure drop. As shown in FIGS. 2 and 4b, the first electrode, third electrode, second electrode and the optional spacers are arranged in a layered structure. The layered structure is preferably rolled up in an efficient manner. The method preferably further comprises rolling the first electrode, third electrode and second electrode in the layered structure into a spiral form around a common longitudinal and/or central axis such that the first electrode, third electrode and second electrode are periodically repeated along a radius in a plane perpendicular to the longitudinal and/or central axis to a substantially cylindrical structure. This structure effectively prevents uneven fluid distribution in the device. Additionally, the method preferably further comprises arranging the rolled substantially cylindrical structure into a substantially cylindrical housing. The housing preferably further comprises a first end surface and a second end surface. Further, an inlet at the first end surface of the housing and an outlet at the second end surface of the housing can be arranged such that for each electrode, at least one current collector extends out through the housing through at least one of the first end surface and the second end surface. In this way a compact structure is obtained.

Further, the method preferably further comprises arranging the third electrode such that a circumferential outer peripheral edge of the third electrode coincides with a circumferential peripheral edge of the first electrode and/or a circumferential peripheral edge of the second electrode. This helps the third electrode to distribute the electrical field lines appropriately between the electrodes. The third electrode can be arranged as a ring shaped electrode, such as circular ring, a rectangular ring, square ring or octahedral ring, whereby it is ensured inter alia that the third electrode does not cause any physical division of the aqueous media in the device. The third electrode is preferably arranged at substantially equal distances from the first electrode and the second electrode. In this way, symmetric anion and cation removal capacities which prevent unwanted changes in water pH and chemistry are obtained.

According to one variant or embodiment, freely combinable with the other embodiments, the method comprises coating the third electrode on an electrically non-conductive spacer, preferably on a flexible electrically non-conductive spacer. Alternatively, the method comprises embedding the third electrode in a monolithic electrically non-conductive spacer, preferably a flexible monolithic non-conductive spacer. In this embodiment, the method comprises arranging the monolithic electrically non-conductive spacer in direct contact with the first electrode at a first side surface of the monolithic spacer and in direct contact with the second electrode at a second side surface of the monolithic spacer.

Figure 6A:
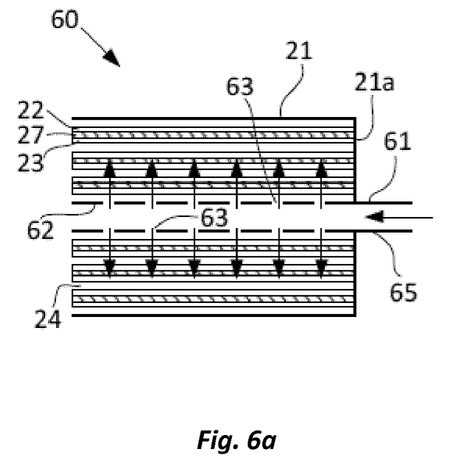
FIG. 6a schematically illustrates a cross sectional view of a device for capacitive deionization according to yet another exemplifying embodiment of the present invention showing a flow path going from the inside and out.

FIG. 6a illustrates a cross sectional view of a CDI device 60 according to yet another exemplifying embodiment of the present invention. The CDI device 60 differs from the CDI device 20 as illustrated in FIGS. 4a and 4b in that the inlet is arranged in the form of a tube 65. The tube 65 is arranged concentrically with the central axis (not shown) of the CDI device. The electrodes 22, 23 and 27 are spirally wound around the central axis in the same manner as disclosed above with regard to FIGS. 4a and 4b, and consequently also spirally wound around the tube 65. The tube 65 comprises a first portion 62 arranged internal to a housing 21, and a second portion 61 arranged to extend through the housing 21. The first portion 62 comprises a plurality of perforations or through-holes 63 along the longitudinal extension thereof. The second portion 61 of the tube 65 does not comprise any through-holes or perforations. Liquid may be pumped into the CDI device via the second portion 61 of the tube 65. By means of the perforations or through-holes 63 in the second portion 62 of the tube evenly distributed in the CDI device along the length of the central axis of the CDI device, the liquid flows radially out of the tube 65 via the perforations or through-holes 63 as demonstrated by the arrows. The liquid may exit the CDI device via one or more outlets (not shown) arranged in the housing 21 for example at an end surface opposing the first end surface 21a. Alternatively, the liquid may exit the device essentially radially via one or more outlets distributed evenly along the longitudinal extension of the CDI device (compare also with the device 70 shown in FIG. 6b).

Figure 6B:
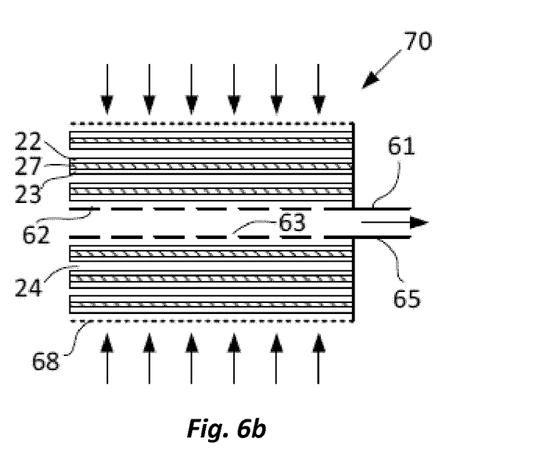

FIG. 6b illustrates a cross sectional view of a CDI device 70 which is similar to the CDI device 60 shown in FIG. 6a. However, the flow of liquid inside the CDI device 70 is in the opposite direction of the flow of liquid in the CDI device 60, as shown by the arrows. The CDI device 70 shown in FIG. 6b preferably further comprises a housing having a liquid permeable envelope surface wall 68 intended to protect the constituent components of the CDI device but which is not intended to obstruct any flow of liquid there through. According to this exemplifying embodiment, the liquid will enter through the envelope surface wall 68, pass the electrodes 22, 27 and 23, and thereafter flow through the perforations of through-holes 63 in the first portion 62 of the tube 65, and thereafter exit the CDI device via the second portion 61 of the tube 65.

The CDI device according to the present invention can also be achieved by modifying any traditional 2-electrode capacitive deionization unit by introducing the third electrode as described above and adapting the electrical connections such that the third electrode is grounded and the first and second electrode are polarized with opposite charges with respect to the third electrode.

The first and second electrodes are preferably made of flexible electrically conducting material, such as activated carbon cloth having a specific surface area of at least 100 $m^2/g$, preferably at least 200 $m^2/g$, more preferably at least 400 $m^2/g$ or 600 $m^2/g$, more preferably at least 800 $m^2/g$, and for example preferably a specific surface area of about 1000 $m^2/g$.

The third electrode may be made of the same material as the first and second electrodes, or made of another material as disclosed above. The electrically non-conductive spacer(s) can be made of any previously known material used for this purpose. The material of the spacer(s) should be an insulating porous material which allows for easy transport of the fluid along with the charged species to be removed. Furthermore, the current collectors can be made of any previously known material for this purpose, for example graphite.

The CDI device according to the present invention may be altered in many ways. For example, the primary electrodes may be made of any kind of material previously known for CDI devices as long as the materials thereof are not specifically provided to obtain an asymmetric ion removal. The primary electrodes are preferably made of the same kind of material. While not necessary, the primary electrodes could also, if desired, be coated with specific, selectively permeable materials to allow only one kind of ion to pass through to each primary electrode, wherein a material allowing only anions can be coated/placed on top/in front of the primary electrode polarized positively with respect to the third electrode and a material allowing only cations can be coated/placed on top/in front of the primary electrode polarized negatively with respect to the third electrode. In this case the first surface of the third electrode would be in contact with the first surface of the material allowing anions through and the second surface of the third electrode would be in contact with the first surface of the material allowing only cations.

Furthermore, the DC power source may be a part of the capacitive deionization device as such. For example, the CDI device may comprise at least one battery, solar cell, fuel cell or the like. Alternatively, the DC power source may be a separate component, in which case the CDI device is configured to be connected to the separate DC power source. For example, the DC power source may be at least one battery, generator or the like. For example, in the case of use of batteries (or solar cells), two batteries can be connected in series, wherein the positive and negative of the first battery and the second battery are shorted and a connection can be extended from this point to the third electrode to act as the reference potential, while the other two battery terminals are connected to the positively and negatively polarized primary electrodes.

While not specifically shown in all of the drawings above, the CDI device preferably also comprises an external housing serving as a protective cover to the other constituent components of the CDI device. The housing is, if so desired, configured to ensure that the aqueous media is confined in the CDI device during the removal of the charged species therefrom. The housing preferably comprises at least one inlet for the aqueous media to enter into the CDI housing. The inlet may, if desired, be further sub-divided into multiple inlet channels to create uniform flow of the fluid within the primary electrodes of the CDI device.

Figure 7:
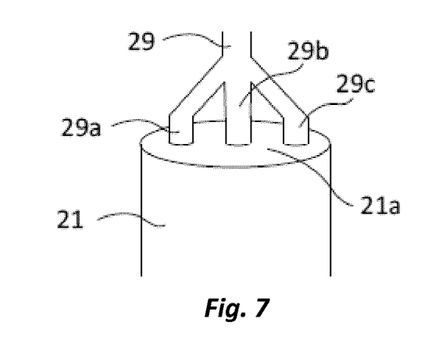
FIG. 7 schematically illustrates a perspective view of a part of a device for capacitive deionization according to yet another exemplifying embodiment of the present invention.

FIG. 7 illustrates one such example, wherein the inlet 29 is divided into a plurality of inlet channels 29a, 29b, 29c which extend through the housing 21 in the end surface 21a thereof. Naturally, the inlet channel can alternatively, or in addition, be divided into multiple inlet channels inside the housing 21.

In case the CDI device is intended to be used for batch use, the inlet also possibly serves as outlet for the aqueous media after the capacitive deionization has been completed to the degree intended or alternatively, there might be an outlet separate from the inlet. However, for most practical applications, the capacitive deionization is intended for a continuous use and hence continuous flow of aqueous media through the device, and the CDI device therefore preferably comprises an outlet for the aqueous media separate from the inlet. Naturally, the CDI device may comprise more than one outlet if desired.

Figure 8:
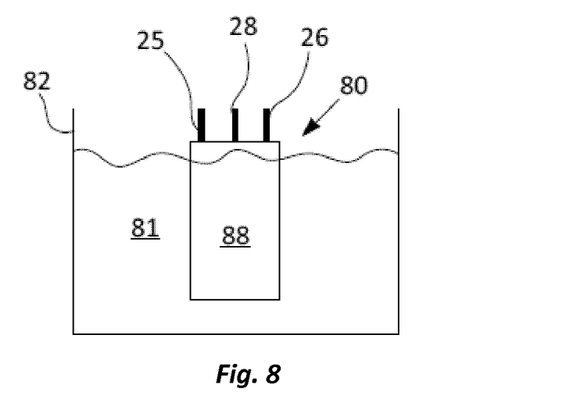
FIG. 8 schematically illustrates an exemplifying use of a device for capacitive deionization according to an exemplifying embodiment of the present invention.

The CDI device according to the present invention is suitable to use in applications where the liquid from which ionic species should be removed is introduced into the CDI device. However, as an alternative, the device is submerged into the liquid from which the ionic species is to be removed. Such a use is exemplified in FIG. 8, wherein a CDI device 80 is at least partly submerged in a tank 82 or any other form of container or receptacle containing a liquid 81 from which ionic species present is/are to be removed. The CDI device 80 preferably has a configuration such that the current collectors 25, 26 and the connection means 28 extend out of the CDI device in the same direction, as shown in FIG. 8. Furthermore, the CDI device 80 preferably has a liquid permeable housing 88 through which liquid may both enter and exit the CDI device 80.

In one embodiment, freely combinable with the other aspects and embodiments, the CDI device is a "flow-through" CDI device wherein the general flow of the aqueous media is essentially parallel to the electrical field between the first electrode and the second electrode. In such a case, the aqueous media passes through at least one of the first electrode and the second electrode, preferably through both the first electrode and the second electrode.

Figure 11A:
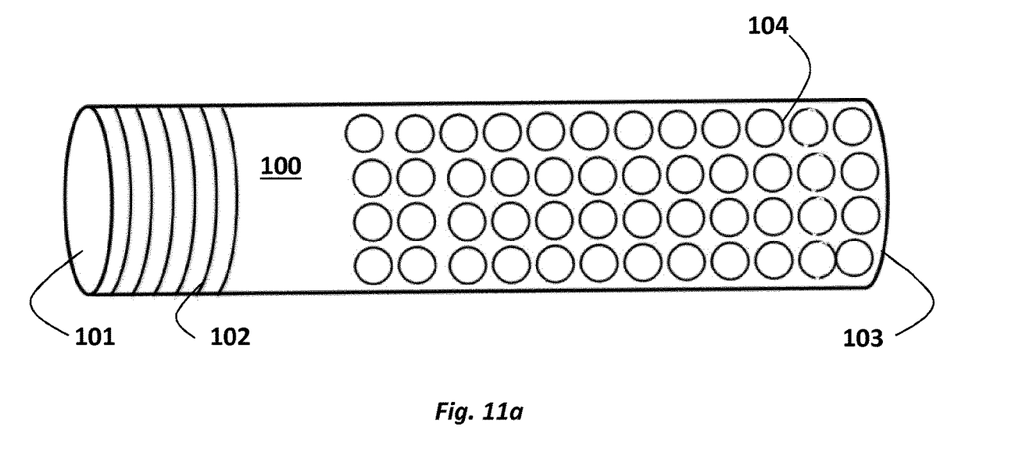
FIG. 11a illustrates a perforated pipe 100 having an open end 101, optionally with threads 102, and a sealed end 103, as well as multiple holes or perforations 104.
Figure 11B:
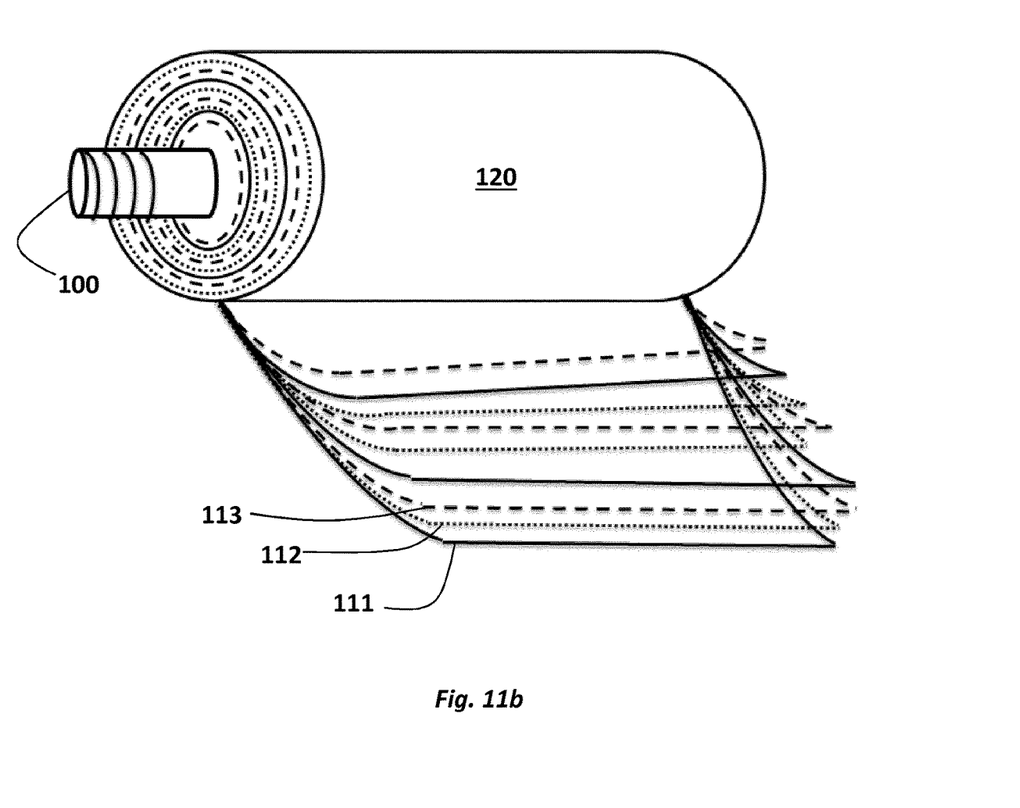
FIG. 11b illustrates an embodiment where layers of graphite foil 111, activated carbon cloth 112, and an ion porous spacer 113 are wound around a perforated pipe 100 as shown in the previous drawing, forming a CDI unit 120.

One embodiment is illustrated in FIG. 11a and FIG. 11b, where a perforated pipe 100 is shown, said pipe having an open end 101, optionally with threads 102, and a sealed end 103, as well as multiple holes of perforations 104. A CDI unit 120 can be formed by winding consecutive layers of graphite foil 111, activated carbon cloth 112, and an ion porous spacer 113 around said perforated pipe 100. This figure is also indirectly illustrative of an embodiment of a method of manufacturing a CDI unit, wherein the first electrode, third electrode and second electrode are arranged around a perforated pipe having an open end and a closed end, said open end of the pipe serving as inlet or outlet for aqueous media to be subjected to capacitive deionization.

Figure 12:
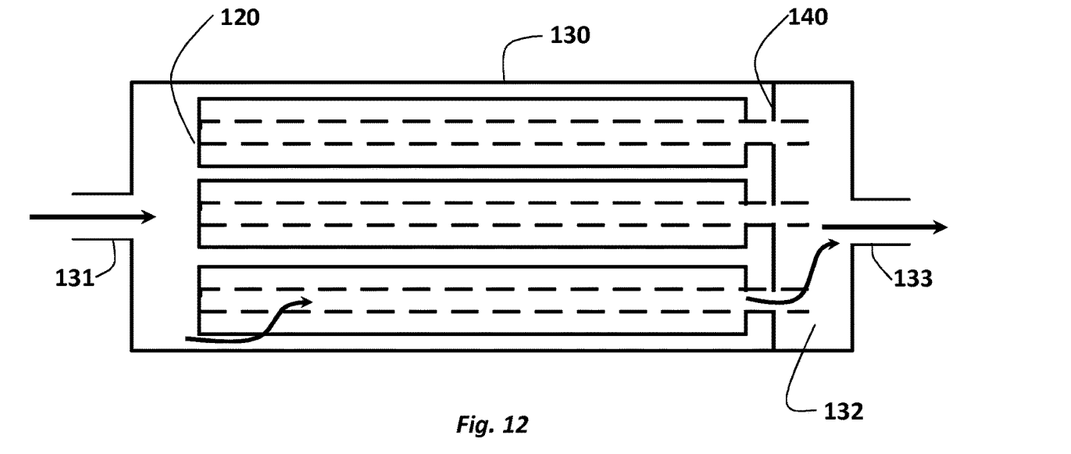

A plurality of such units 120 comprising a perforated pipe and the spiral wound CDI electrodes can be assembled together within a casing or enclosure, forming a cassette 130 as shown in FIG. 12. Said cassette preferably has an inlet 131, a collection reservoir 132 and an outlet 133. The cassette is divided into two parts by a plate 140 in which the units 120 can be attached, e.g. by inserting the open end 101 optionally with threads 102, into holes in said plate 140.

Such cassettes can be arranged in parallel. This has the advantage of making it possible to adjust the capacity by for example operating one or two cassettes. It also allows the user to regenerate one cassette while the other is active, thus ensuring continuous operation. The use of multiple units, cassettes of assemblies in series or in parallel, as well as in other configurations can be resorted to for increasing the capacity, flexibility, security or the redundancy in the system, and they will be obvious to a person skilled in the art.

Alternatively, the CDI device is a "flow-by" CDI device wherein the general flow of the aqueous media is perpendicular to the electrical field between the first electrode and the second electrode.

The device according to the present invention is preferably used for producing drinking water in power and water scare areas, or producing drinking water in public buildings, hospitals, hotels etc. The device is particularly suitable for remote areas without access to municipal water, areas where the municipal water is of poor or uneven quality, or applications where a high and even quality of the water is desired. The device is also suitable for use in treatment of ballast water on vessels/ships. The device can also be used for the purpose of softening water for private, municipal or industrial applications.

EXPERIMENTAL RESULTS

Example 1. Comparison of the Performance of a Two- and Three-Electrode CDI

The ion removal efficiency of a CDI device comprising two primary ACC electrodes and a central third electrode (hereinafter denominated three-electrode cell) was compared with that of a CDI device comprising only two primary ACC electrodes, i.e. without a central third electrode (hereinafter denominated two-electrode cell). The central third electrode in the three-electrode cell was made of graphite plate.

The primary electrodes for both the two-electrode cell and the three-electrode cell each had an electrode surface area of 9 $cm^2$. The central electrode, i.e. the third electrode, in the three-electrode cell was in the shape of a ring having a circumferential outer edge following the circumferential outer edges of the primary electrodes and having an electrode surface area of 2 $cm^2$. The third electrode had a specific surface area equal to 0.5% (1.25 $m^2$) of the total specific surface area of a single primary electrode (250 $m^2$). As influent, deionized water with an addition of 1 g/L of NaCl was used and an influent flow rate of 3 mL/min was used.

For the two-electrode cell, the applied DC potential was +1.6 V DC between the two primary electrodes. For the three-electrode cell, the applied DC potential was +0.8V DC between the positive electrode and the central third electrode, and −0.8V DC between the negative electrode and the central third electrode. Thus, the total potential difference between the primary electrodes of the CDI devices was 1.6 V DC for both the two-electrode cell and the three-electrode cell. Both cells used two layers of cellulose material as the non-conductive spacer, wherein for the three-electrode cell the third electrode was inserted between the two cellulose spacers to electrically isolate it from the two primary electrodes. As the third electrode was in the shape of an open ring and the two primary electrodes were not bound to the rigid current collectors, the distance of the active area (region contributing to ion removal) of the two primary electrodes (open area of the ring) is effectively similar for the two- and three-electrode cells and its effect on ion removal can be neglected.

Conductivity change of the influent was monitored at the output of the cell to measure the ion removal/adsorption efficiency of the CDI devices. Simultaneously, charging and discharging currents were recorded to calculate the power consumption during the desalination process and estimate the total power consumption per $m^3$ (1000 litres) of water desalted.

Figure 9:
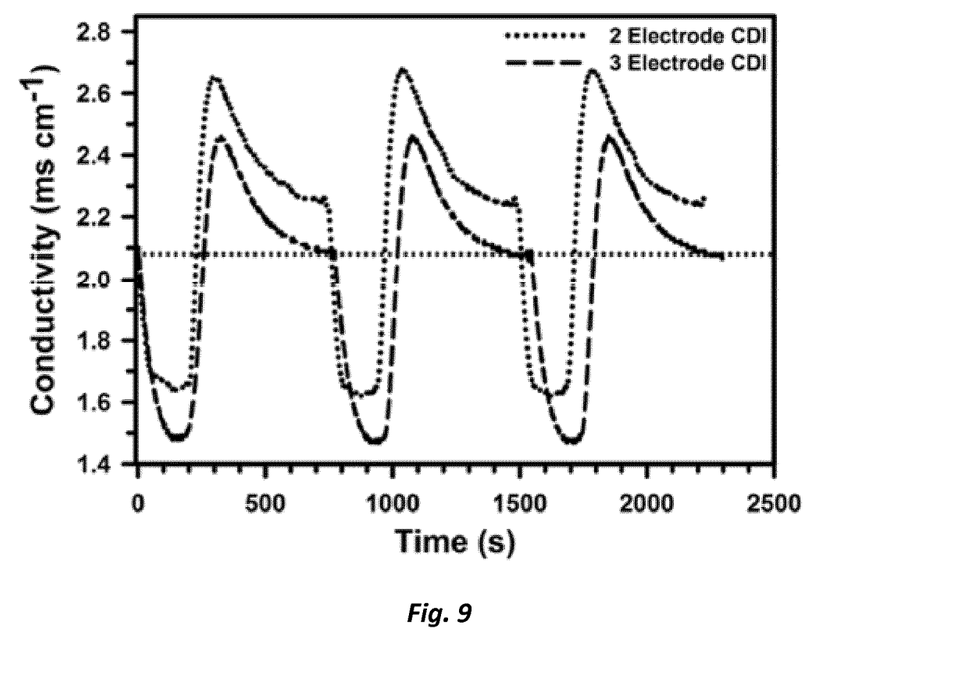
FIG. 9 illustrates experimentally obtained conductivity curves over time for a CDI device according to prior art compared to a CDI device according to one exemplifying embodiment of the present invention.
Figure 10:
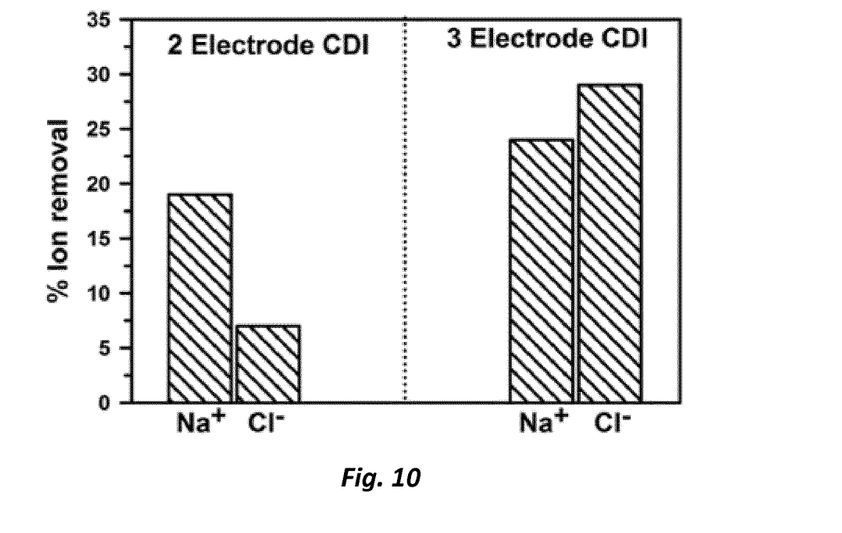
FIG. 10 illustrates the anion and cation removal efficiencies for a two-electrode CDI device according to the prior art compared to a three-electrode CDI device according to an exemplifying embodiment of the present invention.

FIG. 9 illustrates the conductivity curves obtained for the two-electrode cell and the three-electrode cell, respectively. FIG. 10 illustrates the anion and cation removal efficiencies for the two-electrode cell and the three-electrode cell, respectively. Table 1 specifies the desalination efficiency, salt adsorption capacity and power consumption obtained.

TABLE 1

Desalination efficiency, salt adsorption capacity and power consumption for two-electrode cell and three-electrode cell, respectively

| Configuration | Desalination efficiency (%) | Specific salt adsorption (mg/g) | Charge efficiency (%) | kWh/$m^3$ of water desalted |
|---|---|---|---|---|
| two-electrode cell | 22 | 8.1 | 68 | 0.85 |
| three-electrode cell | 30 | 11.3 | 93 | 0.61 |

From the result shown in FIG. 9 it can be seen that the desalination efficiency of the three-electrode cell is better than the two-electrode cell by 36%. FIG. 10 suggests that the increase in salt removal efficiency for the three-electrode cell could be due to the symmetric removal of both anions and cations, attributed to the well distributed potential leading to equal and opposite electric fields present between the primary electrodes and the third electrode in the two electrical halves of the three-electrode CDI cell. The symmetric repulsion of cations from the positive electrode and anions from the negative electrode with simultaneous adsorption at the opposite-electrodes leads to efficient removal of both ions from the water and an improved specific salt removal capacity. In comparison, for the two-electrode cell, there is a repulsion of cations from the CU cell positive electrode leading to their removal, but because the other (i.e. the negative electrode) electrode is at a potential close to 0 V DC (connected to power supply negative/ground), there is no repulsion of anions in solution, limiting their efficiency as seen in FIG. 10. The results also suggest that repulsion is an important aspect for ion removal and cannot be disregarded.

The symmetric removal of the ions from the water feed stream also reduces the power consumption for the entire process as illustrated in Table 1. Simultaneously, a 40% improvement in the specific salt adsorption capacity was also evident along with a 37% improvement in the charge efficiency and 28% reduction in kWh/$m^3$ of desalted water of the three-electrode cell as compared to the two-electrode cell. Charge efficiency basically defines the ratio of charge input in coulombs to the cell to the equivalent coulombic charge of ions removed from the water stream. A charge efficiency of 100% means that for every electron/hole input to the cell, one cation/anion is removed from the cell.

Without further elaboration, it is believed that a person skilled in the art can, using the present description, including the examples, utilize the present invention to its fullest extent. Also, although the invention has been described herein with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A capacitive deionization device (10) comprising a first electrode (2) and a second electrode (3), the second electrode (3) opposing the first electrode (2), wherein the first electrode (2) and the second electrode (3) are separated from each other by at least one electrically non-conductive spacer (4, 4') arranged between the first electrode and the second electrode, wherein the device further comprises a third electrode (7) between the first electrode (2) and the second electrode (3), the third electrode (7) allowing substantially unrestricted flow of aqueous media from a first side of the third electrode facing the first electrode (2) to a second side of the third electrode facing the second electrode (3), wherein the third electrode (7) is electrically grounded, and the first electrode (2) and the second electrode (3) are polarizable with opposite charges with respect to the third electrode (7), wherein each one of the first electrode (2), the second electrode (3) and the third electrode (7) is made of a chemically inert and flexible material, and wherein the first electrode (2), the second electrode (3), and the third electrode (7) are arranged in a spiral form around a longitudinal and/or common central axis such that the first electrode (2), third electrode (7) and second electrode (3) are periodically repeated along the radius in a plane perpendicular to the longitudinal and/or central axis and jointly form a substantially cylindrical structure.

2. The device according to claim 1, wherein the third electrode comprises a circumferential outer peripheral edge which has substantially the same circumferential size and shape as a circumferential peripheral edge of the first electrode and/or a circumferential peripheral edge of the second electrode.

3. The device according to claim 1, wherein the third electrode has a geometrical configuration of a ring.

4. The device according to claim 3, wherein the ring is a circular ring, a rectangular ring, a square ring, or a octahedral ring.

5. The device according to claim 1, wherein the third electrode is arranged at substantially equal distances from the first electrode and the second electrode.

6. The device according to claim 1, wherein the third electrode is made of carbon or a carbon-based material.

7. The device according to claim 6, wherein the carbon or a carbon-based material comprises an activated carbon cloth, a graphite plate or one or more graphene sheets.

8. The device according to claim 1, wherein the third electrode is arranged in the form of a coating on a flexible electrically non-conductive spacer.

9. The device according to claim 1, wherein the third electrode is embedded in a flexible monolithic electrically non-conductive spacer.

10. The device according to claim 1, wherein the third electrode is printed on a flexible electrically non-conductive spacer.

11. The device according to claim 9, wherein the flexible monolithic electrically non-conductive spacer is in direct contact with the first electrode at a first side surface of the monolithic spacer, and in direct contact with the second electrode at a second side surface of the monolithic spacer.

12. The device according to claim 1, further comprising a substantially cylindrical housing in which the substantially cylindrical structure is arranged, an inlet at a first end surface of the housing and an outlet at a second end surface of the housing, wherein each of the electrodes comprises at least one current collector extending out from the housing through one of the first end surface and the second end surface.

13. A capacitive deionization arrangement comprising a plurality of capacitive deionization devices, wherein at least one of the plurality of capacitive deionization devices is a capacitive deionization device according to claim 1.

14. A method of deionizing an aqueous media comprising using a capacitive deionization device according to claim 1 for removing charged species from the aqueous media.

15. A method of deionizing an aqueous media comprising using an arrangement according to claim 13 for removing charged species from the aqueous media.

16. A method of manufacturing a capacitive deionization device, the method comprising providing a first electrode, arranging a third electrode on a first side of the first electrode and arranging a second electrode on a second side of the third electrode, wherein the third electrode allows free flow of aqueous media from a first side surface of the third electrode facing the first electrode to a second side surface of the third electrode facing the second electrode, providing a grounded connection to the third electrode and connecting the first electrode and the second electrode such that they are polarizable with opposite charges with respect to the third electrode, wherein each one of the first electrode, the second electrode and the third electrode is made of a chemically inert and flexible material, and rolling the first electrode, third electrode and second electrode in a spiral form around a common longitudinal and/or central axis such that the first electrode, third electrode and second electrode are periodically repeated along a radius in a plane perpendicular to the longitudinal and/or central axis and jointly form a substantially cylindrical structure.

17. The method according to claim 16, further comprising arranging the rolled substantially cylindrical structure into a substantially cylindrical housing comprising a first end surface and a second end surface, arranging an inlet at the first end surface of the housing and an outlet at the second end surface of the housing, and arranging for each of the electrodes at least one current collector extending out through the housing through at least one of the first end surface and the second end surface.

18. The method according to claim 16, wherein the first electrode, third electrode and second electrode are arranged around a perforated pipe having an open end and a closed end, said open end of the pipe serving as inlet or outlet for aqueous media to be subjected to capacitive deionization.

* * * * *

UNITED STATES PATENT AND TRADEMARK OFFICE
CERTIFICATE OF CORRECTION

PATENT NO. : 12,030,795 B2
APPLICATION NO. : 16/623280
DATED : July 9, 2024
INVENTOR(S) : Dutta et al.

Page 1 of 1

It is certified that error appears in the above-identified patent and that said Letters Patent is hereby corrected as shown below:

In the Specification

Column 3, Line 14: Please correct "CU" to read --CDI--

Column 4, Line 4: Please correct "CU" to read --CDI--

Column 4, Line 55: Please correct "CU" to read --CDI--

Column 6, Line 54: Please correct "CU" to read --CDI--

Column 7, Line 32: Please correct "CU" to read --CDI--

Column 8, Line 21: Please correct "CU" to read --CDI--

Column 10, Line 51: Please correct "CU" to read --CDI--

Column 19, Line 55: Please correct "CU" to read --CDI--

Signed and Sealed this
Twenty-fourth Day of September, 2024

Katherine Kelly Vidal
*Director of the United States Patent and Trademark Office*